United States Patent [19]

Fimeri

[11] Patent Number: 4,856,885
[45] Date of Patent: Aug. 15, 1989

[54] MIRROR ORIENTATION CONTROL MEANS

[75] Inventor: Garry G. L. Fimeri, Lonsdale, Australia

[73] Assignee: Britax Rainsfords Pty. Ltd., Lonsdale, Australia

[21] Appl. No.: 190,013

[22] Filed: May 4, 1988

[30] Foreign Application Priority Data

May 4, 1987 [AU] Australia .................... PI1719

[51] Int. Cl.⁴ .................... B60R 1/06; G02B 5/08
[52] U.S. Cl. .................... 350/633; 350/634; 350/636; 350/637
[58] Field of Search ............... 350/633, 634, 636, 637

[56] References Cited

U.S. PATENT DOCUMENTS

| | | | |
|---|---|---|---|
| 4,482,211 | 11/1984 | Fisher | 74/411 |
| 4,504,117 | 3/1985 | Mittelhäuser | 350/636 |
| 4,678,295 | 7/1987 | Fisher | 350/634 |
| 4,770,522 | 4/1988 | Alten | 350/633 |

FOREIGN PATENT DOCUMENTS 2102364 2/1983 United Kingdom ............... 350/634
2157387 10/1985 United Kingdom .

OTHER PUBLICATIONS

Patent Abstracts of Japan, vol. 9, No. 107, May 11, 1985.

Primary Examiner—Bruce Y. Arnold
Assistant Examiner—R. D. Shafer
Attorney, Agent, or Firm—Klauber & Jackson

[57] ABSTRACT

A mirror housing is provided with two motor driven gear nuts each of which comprises a conductive material which however has a high resistance, and each of which engages a conductive wiper and threads on a respective screw shaft non-rotationally coupled to a mirror holder, one gear nut being operable in a direction to tilt a mirror in an horizontal plane and the other in a direction to tilt a mirror in a vertical plane, and conductors contact the ends of the gear nuts, so that when a voltage is applied across them, the voltage on the conductive wiper will be a function of the positions of the screw shafts in their nuts, thereby constituting position sensing means.

6 Claims, 3 Drawing Sheets

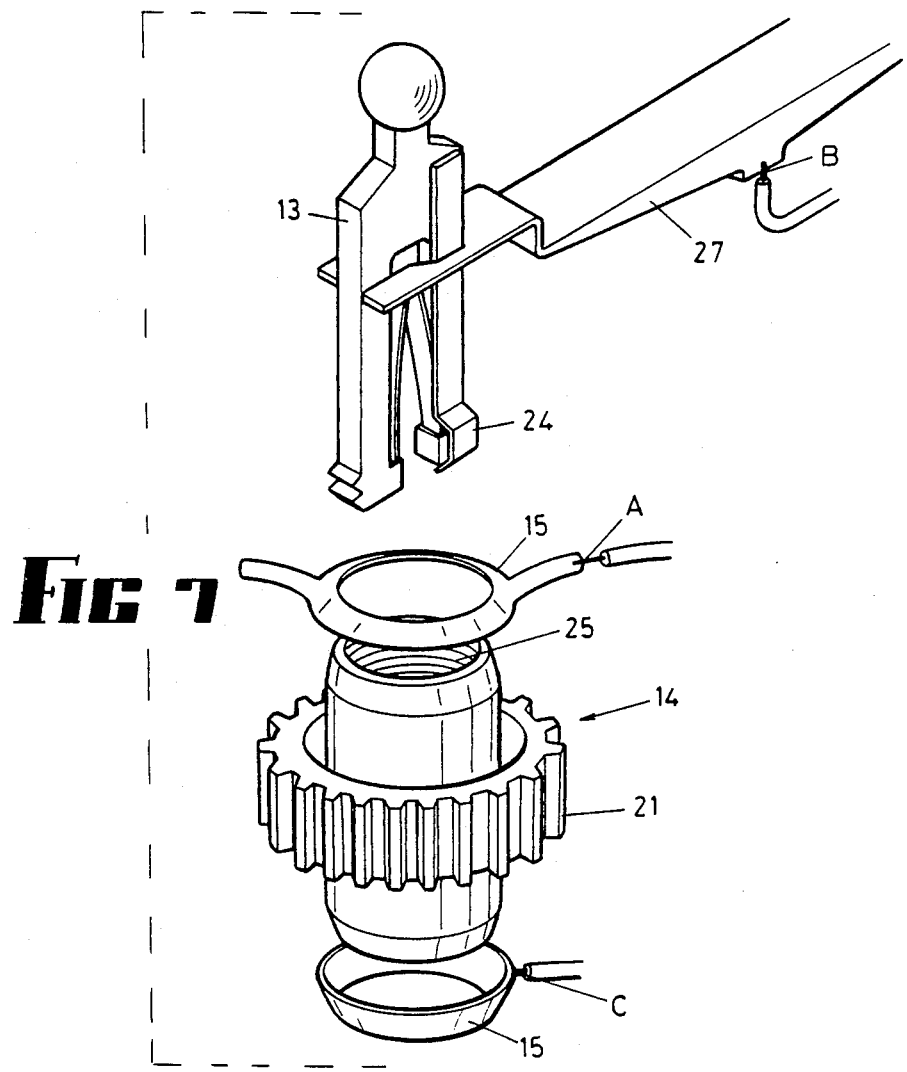

MIRROR ORIENTATION CONTROL MEANS

This invention relates to control means for controlling the orientation of the rear vision mirror of a motor vehicle.

BACKGROUND OF THE INVENTION

Electrically controlled rear vision mirrors are in common use, and usually incorporate a mechanism consisting of one or two miniature electric motors driving, via reduction gear systems, a mirror holder rotationally and separately through two axes disposed at 90° to one another.

The motors usually drive the mirror holder through a gear system, the shaft of each motor having on it a gear drive worm which engages the teeth of a respective spur or helical gear over a segment of the diameter of the worm gear. The spur or helical gear usually comprises a nut having a co-axial screw thread which engages a non-rotational screw shaft connected pivotally to the mirror holder at a point radially displaced from the tilt axis of the mirror holder.

Motor vehicles frequently carry micro-processors having large memory banks which are not fully utilized, and have sufficient surplus capacity to control orientation of the mirrors, for example to occupy former positions suitable for a specific driver. This avoids the need for a driver to separately adjust each mirror each time he enters a vehicle, since he can effect the required adjustments by utilizing the memory bank facilities. However to achieve this it is necessary for there to be position sensing means within the mirror housing, and position sensing means usually involve potentiometers, which, in a mirror, would be coupled to the mirror housing directly or indirectly so as to sense the mirror position. They would transmit respective voltage signals to the micro-processor which would identify the mirror orientation with sufficient accuracy to be practicable. Such an arrangement would employ known principles.

However, a mirror housing is essentially a small housing, and it is inconvenient to use separately positioned potentiometers therein. Further, potentiometers add to the cost of the assembly. There are usually two electrically adjusted mirrors on a vehicle, and therefore it becomes necessary to have a total of four potentiometers.

The main object of this invention is to provide improvements whereby the costs can be reduced and yet whereby excellent potentiometer provisions are made without the need for additional devices to be included within a mirror housing.

BRIEF SUMMARY OF THE INVENTION

In this invention, a mirror housing is provided with two motor driven gear nuts each of which comprises a conductive material which however has a high resistance, and each of which engages a conductive wiper and threads on a respective screw shaft non-rotationally coupled to a mirror holder, one gear nut being operable in a direction to tilt a mirror in an horizontal plane and the other in a direction to tilt a mirror in a vertical plane, and wiper contacts engage the ends of the gear nuts, so that when a voltage is applied across them, the voltage on the conductive wiper will be a function of the positions of the screw shafts in their nuts, thereby constituting position sensing means.

More specifically, the invention consists of control means for controlling the orientation of a rear vision mirror of a mirror assembly of a motor vehicle wherein a pair of electric motors drive respective gear nuts which threadably engage respective non-rotational screw shafts pivoted to a mirror backing plate which retains said mirror, each said gear nut comprising conductive material, wiper contacts comprising bearings contacting the ends of each gear nut, each gear nut having sufficient resistance between its ends to provide a potential gradient when a voltage is applied to the conductor bearings from the vehicle's electrical system, a conductive wiper in contact with a surface of said gear nut thereby receiving a voltage signal from said potential gradient which is a function of the position of the screw shaft within the nut, thereby in turn sensing orientation of the mirror.

The invention thereby provides the primary signal for control of orientation of the mirror, and avoids the need for separate potentiometers within the housing.

An embodiment of the invention is described hereunder in further detail with respect to, and is illustrated in, the accompanying drawings in which:

FIG. 7 is an exploded perspective view illustrating the potentiometer components.

Figure 1:
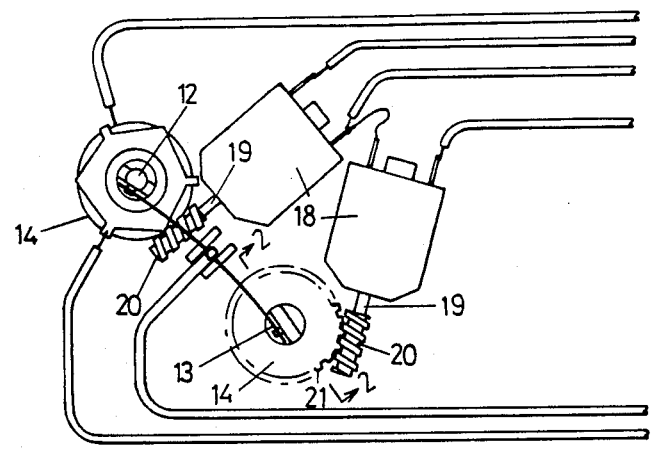
FIG. 1 is an elevational view rearwardly of a mirror face showing a motor mechanism for effecting tilt of a mirror housing.
Figure 2:
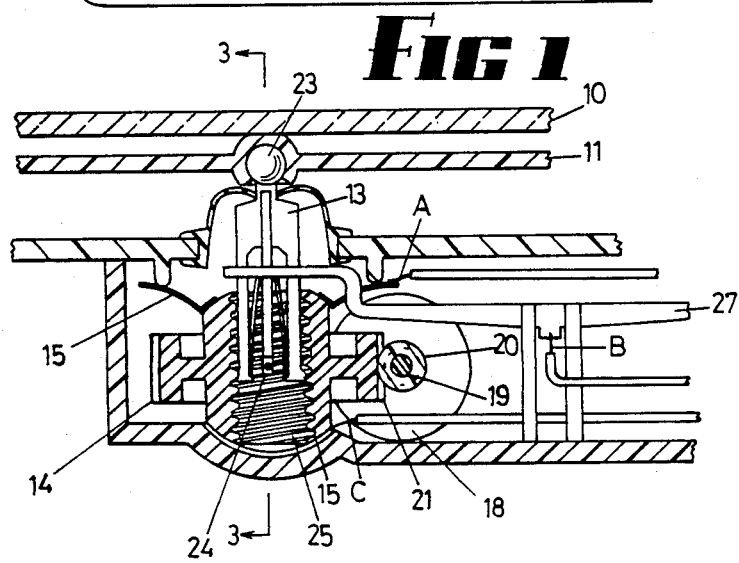
FIG. 2 is a part-section taken on the line 2—2 of FIG. 1, but drawn to a larger scale.
Figure 3:
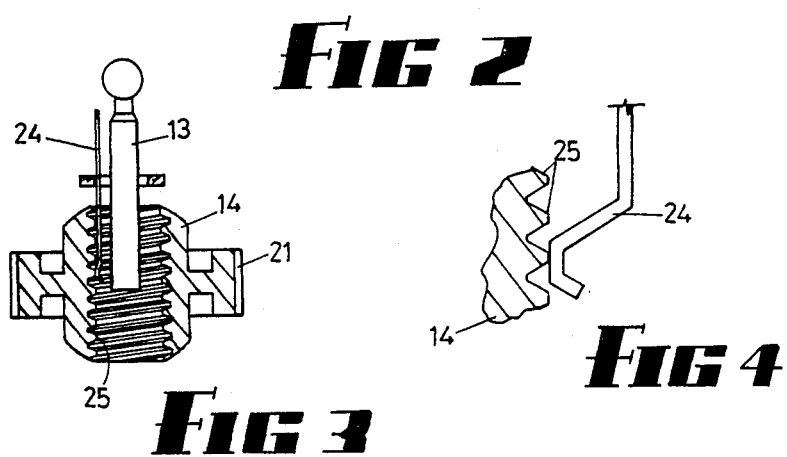
FIG. 3 is a fragmentary section taken on the line 3—3 of FIG. 2.

In this embodiment, a mirror 10 is carried by a mirror backing plate 11 (seen only in FIG. 2). The position of plate 11 is adjusted in the horizontal plane by a screw shaft 12 and in a vertical plane similarly by a further screw shaft 13. Each of a pair of gear nuts 14 is engaged by resilient metal wiper contacts 15 which constitute bearings, there being one wiper contact bearing against an upper surface and the other wiper contact bearing against the lower surface of each gear nut 14. The wiper contacts are themselves formed from metal having resilient characteristics so that a good electrical contact is maintained with the gear nuts, and the contact surfaces of both the nuts and wiper contacts are part-spherical.

There are provided two electrical motors 18, the output shafts 19 of which carry respective gear worms 20 which mesh with spur (or helical) teeth 21 of respective gear nuts 14, to effect rotation thereof. Rotation of each gear nut 14 will cause inward or outward movement of its respective screw shaft 12 and 13, thereby tilting the mirror either about an horizontal or a vertical axis.

Each screw shaft 12 and 13 terminates in a ball 23 which non-rotationally engages a part-spherical socket in the mirror backing plate 11 to effect this movement.

Figure 4:
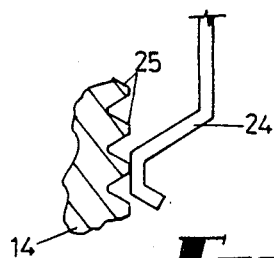
FIG. 4 is a detailed view illustrating the way in which a wiper on the screw shaft bears against a surface of the gear nut, for electrical conductivity purposes.

Each screw shaft 12 and 13 is provided with a conductive wiper 24 which is best shown in FIGS. 4 and 7 and comprises a spring metal strip which bears against the crests of the threads 25 of a gear nut 14. The conductor B is coupled to the conductive wiper 24 through a support arm 27, while conductors A and C are coupled to the respective wiper contacts 15, so that the arrangement is electrically similar to a potentiometer. When a voltage is applied to conductors A and C, a potential gradient exists across nut 14, and conductive wiper 24 receives a voltage signal from the potential gradient which is a function of the screw shaft position within the nut and thereby senses the orientation of the mirror. This signal can be fed to a micro-processor which can control operation and direction of rotation of output shaft 19 to vary orientation in accordance with stored data.

If use is made of a carbon filled nylon, for example a product sold by LMP Corporation of 412 King Steet, Malvern, Pa., U.S.A., sufficient resistance is contained within each gear nut for an effective potentiometer function to be established. Thus the conductors A, B and C provide sensing means which will sense the orientation of a rear vision mirror both with respect to a vertical and an horizontal plane.

Obviously the conductive wiper 24 can be varied in its construction or location. It can, for example, be carried by the backing plate 11 and wipe the outer surface of a nut 14.

Figure 5:
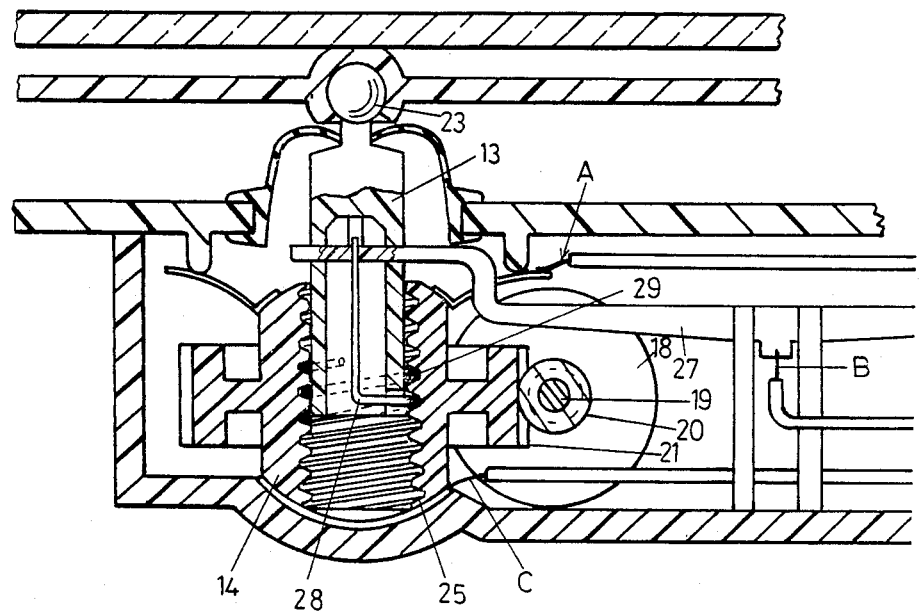
FIG. 5 is a section which corresponds to FIG. 3 but is drawn to a larger scale, and illustrates an alternative contact arrangement.

FIG. 5 shows a further alternative wherein support arm 27 carries on its end a depending wire 28 within screw shaft 13, the lower end of wire 28 being an helix 29 which is engaged by the threads 25 complementary thereto. The helix therefore provides an alternative wiper structure to that desginated 24 in FIG. 4.

Figure 6:
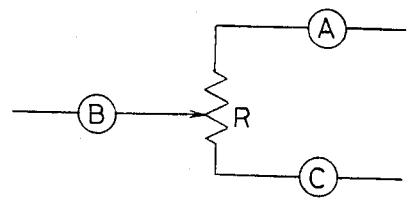
FIG. 6 is a schematic diagram showing an electrical equivalent potentiometer.

FIG. 6 is an equivalent circuit showing conductors A, B and C, and resistance R being the equivalent to the resistance of a nut 14 between conductor bearings 15.

I claim:

1. Control means for controlling the orientation of a rear vision mirror of a mirror assembly of a motor vehicle wherein a pair of electric motors drive respective gear nuts which threadably engage respective non-rotational screw shafts pivoted to a mirror backing plate which retains said mirror, each said gear nut comprising conductive material, wiper contacts comprising bearings contacting the ends of each gear nut, each gear nut having sufficient resistance between its ends to provide a potential gradient when a voltage is applied to the wiper contacts from the vehicle's electrical system, and
a conductive wiper in contact with a surface of said gear nut, thereby receiving a voltage signal from said potential gradient which is a function of the position of the screw shaft within the nut, thereby in turn sensing orientation of the mirror.

2. Control means according to claim 1 wherein each said gear nut comprises a molding of carbon filled nylon.

3. Control means according to claim 1 or claim 2 wherein each said conductive wiper comprises a spring metal strip which bears against the threads of its said gear nut.

4. Control means according to claim 1 or claim 2 wherein the ends of each said gear nut and each said wiper contact is part-spherical in shape.

5. Control means according to claim 1 wherein each said conductive wiper comprises a wire helix which engages the threads of its said gear nut.

6. Control means according to claim 1 wherein each said screw shaft terminates at one end in a ball, said mirror backing plate comprising a pair of part-spherical sockets defined by socket walls which engage respective said balls.

* * * * *